Patented June 13, 1944

2,350,985

UNITED STATES PATENT OFFICE 2,350,985

SOLUTION FOR THE PREPARATION OF RAYON

Kenneth R. Brown, West Chester, Pa., assignor to Atlas Powder Company, Wilmington, Del., a corporation of Delaware No Drawing. Application July 10, 1942, Serial No. 450,489

7 Claims. (Cl. 106—167)

This application relates to the stabilization of blue solutions used in the cuprammonium process for the manufacture of rayon.

The cuprammonium process for the manufacture of rayon is well known in the art. Briefly described, it comprises dissolving cellulosic material, usually cotton linters, in a solution of copper tetrammonio-hydroxide and/or carbonate to produce what is commonly called blue solution. Blue solution is then extruded through a spinnerette, usually in the form of an orifice plate, into a bath in which the blue solution gels and sets into a filament and from which it is drawn and collected, usually on reels or in centrifugal baskets. Setting baths may be of a number of different compositions depending on the type of rayon desired. Hot water and alkali baths have been found quite effective.

Blue solutions to which this application is particularly directed have been prepared in a number of ways. One manner has been by precipitating a complex basic copper sulfate from a copper sulfate solution by means of caustic soda or soda ash, washing the precipitate, then triturating the precipitate with cotton linters and water until a fairly homogeneous pasty mass is obtained, adding ammonia and water, and mixing at a temperature of about 5° C. Another common method of preparing the blue solution has been to dissolve copper metal in an ammonia solution through which air is passed, and then to dissolve the cellulose in that solution. After preparation, blue solutions are usually clarified and then passed through spinnerettes.

Blue solutions have shown a tendency to be unstable, particularly when warm, and to decompose and turn brown. A number of agents have been added to blue solutions to stabilize them. A few such agents are sucrose, tartaric acid, and starch. These have not, however, been entirely satisfactory. It is an object of this invention to provide blue solutions of improved stability.

It has been discovered that blue solutions are stabilized in an improved manner if included with them is a stabilizing agent which comprises a water soluble hydroxy alkylene ether of a polyhydric compound having at least 2 hydroxyl groups. As exemplary of such compounds may be mentioned condensation products of alkylene oxides with ethylene glycol, glycerine, hexitols, and sugars. Sugars may be monosaccharides such as pentoses or hexoses, as for example glucose, or higher saccharides, for example, sucrose. Of the alkylene oxides, ethylene and propylene are to be preferred. It is to be noted that a given polyhydric compound may be combined with any number of alkylene oxide groups, for alkylene oxides may condense with hydroxyl groups of polyhydric compounds, or on hydroxyl groups of hydroxy alkylene ethers thereof. The hydroxy alkylene ethers of polyhydric compounds of this invention need not be prepared by condensation of the alkylene oxide with the polyhydric compound, but may be prepared in any convenient manner. Condensation reactions are usually quite conveniently performed, however. Preferred examples of stabilizing compounds of the present invention are hydroxy ethylene, hydroxy propylene, or mixed hydroxy ethylene-propylene ethers of sorbital containing from 6 to 12 ethylene or propylene groups.

The stabilizer may be added during the preparation of the blue solution or after it has been prepared. Usually it is added with the cellulosic constituent.

What is claimed is:

1. A cuprammonium solution of cellulose for use in the manufacture of rayon containing a stabilizing agent which comprises a water soluble hydroxy alkylene ether of a polyhydric compound, said polyhydric compound containing at least 2 hydroxyl groups.

2. A cuprammonium solution of cellulose according to claim 1 in which the stabilizing agent is a water soluble hydroxy alkylene ether of a hexitol.

3. A cuprammonium solution of cellulose according to claim 1 in which the stabilizing agent is a water soluble hydroxy alkylene ether of a sugar.

4. A cuprammonium solution of cellulose according to claim 1 in which the stabilizing agent is a water soluble hydroxy alkylene ether of a polyhydric alcohol.

5. A cuprammonium solution of cellulose according to claim 1 in which the stabilizing agent is a water soluble hydroxy alkylene ether of sorbitol.

6. A cuprammonium solution of cellulose according to claim 1 in which the stabilizing agent is a water soluble hydroxy propylene ether of a polyhydric compound.

7. A cuprammonium solution of cellulose according to claim 1 in which the stabilizing agent is a water soluble hydroxy ethylene ether of a polyhydric compound.

KENNETH R. BROWN.